(No Model.)  2 Sheets—Sheet 2.

E. WESTON.
DYNAMO ELECTRIC MACHINE.

No. 268,331.  Patented Nov. 28, 1882.

Attest:
Raymond F. Barnes.
Walton H. Doggett.

Inventor:
Edward Weston
By Parker W. Page
Atty.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

DYNAMO-ELECTRIC MACHINE.

SPECIFICATION forming part of Letters Patent No. 268,331, dated November 28, 1882.

Application filed August 31, 1882. (No model.)

*To all whom it may concern:*

Be it known that I, EDWARD WESTON, a subject of the Queen of Great Britain, and resident of Newark, in the county of Essex and State of New Jersey, have invented certain new and useful Improvements in Dynamo-Electric Machines, of which the following is a specification, reference being had to the drawings accompanying and forming a part of the same.

My invention relates to dynamo-electric machines in which the field-magnets are energized by a circuit derived from the main or armature circuit; and it consists in the combination, under conditions hereinafter specified, with said derived circuit, of a manual switch for interrupting the generation of the current in the machine.

In a machine in which the field is excited by a circuit derived from the main a path for the current is always provided, whether the external circuit be open or closed, the machine being active as long as the armature is rotated. To check the generation of current requires either the shifting or stoppage of the driving-belt, the removal of one or both commutator-brushes, or the interruption of the field-circuit. These several plans are attended with many difficulties, particularly so the last named, which, notwithstanding, is by far the most desirable, mainly for the reason that it is the quickest and requires less complicated mechanism for effecting it.

In a large and powerful machine, if the derived or field circuit be interrupted while the machine is in action, serious accidents are likely to follow from the effects of the extra current, for with the separation of the contact-points is developed a powerful extra current or discharge that may rupture the insulation of the field, and which is liable to produce injurious sparks and shocks. In order to avoid this I combine with the field-circuit a manual switch with an insulated handle, the contact-points of which are joined by a circuit including a resistance-coil, that takes the extra current and prevents the occurrence of all accidents. This switch is placed on an insulating-plate on one of the poles of the machine, above the commutator, and is constructed as shown in the accompanying drawings, where—

Figure 1:
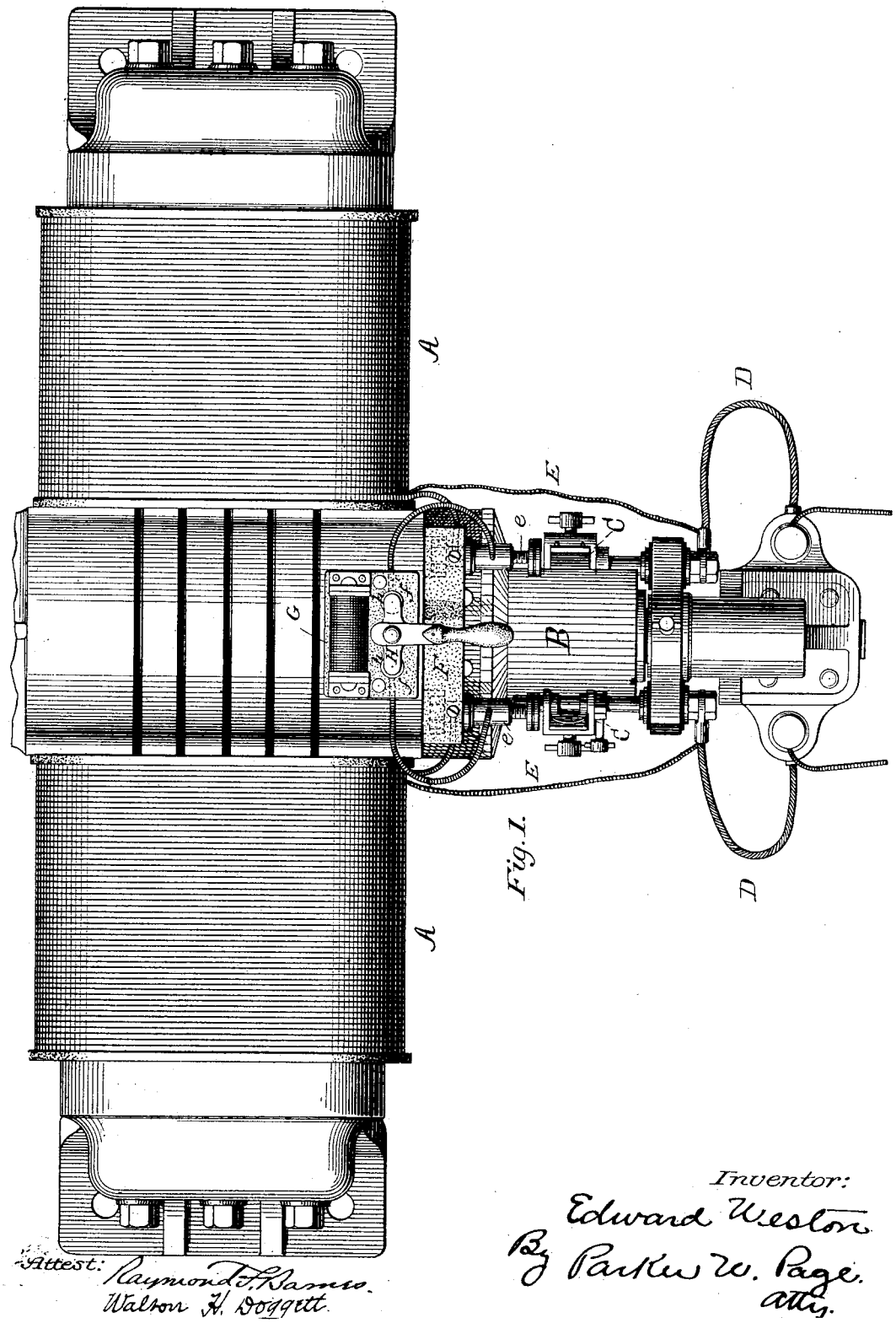
Figure 2:
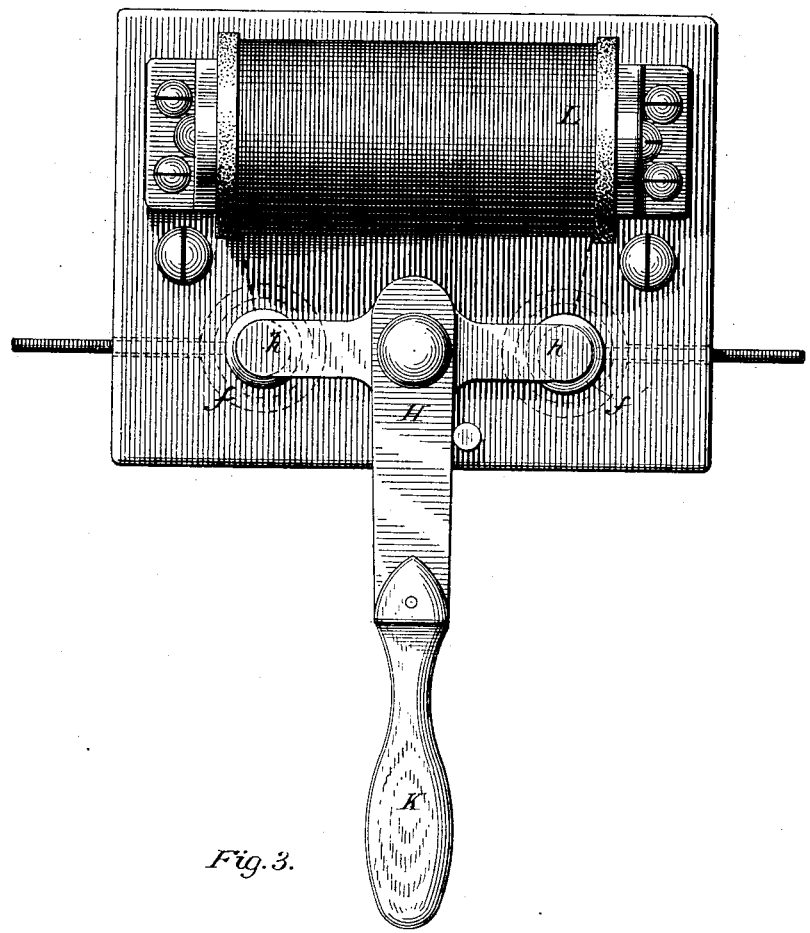
Figure 3:
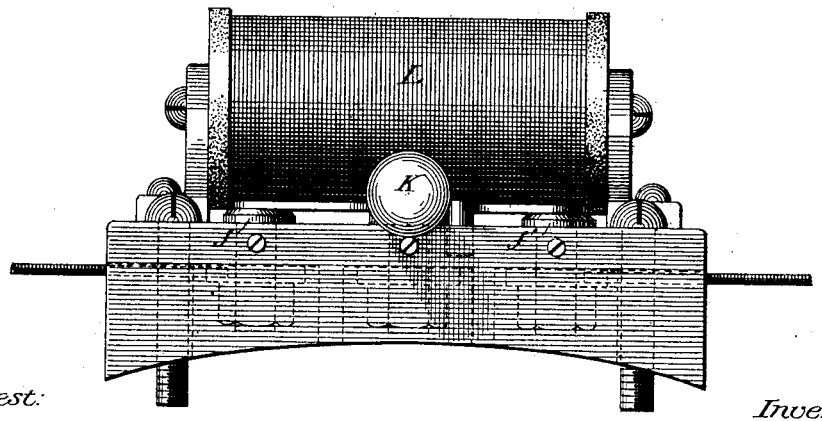

Figure 1 is a top view of a machine with a circuit-breaker of the kind described connected therewith. Fig. 2 is a plan, and Fig. 3 a side elevation, of the circuit-interrupter, both enlarged.

The upper portions of the field-magnets of the machine employed in illustration are designated in Fig. 1 by the letters A A. B is the commutator on the armature-shaft; C C, the brushes that collect the current, and D D stout wires that conduct the current from the brush-holder to the binding-posts of the machine. Wires E E are taken from the main circuit at any convenient point and carried around the field-magnets A A. Their ends are brought out and made fast to binding-posts $e\ e$, set in a plate, F, of insulating substance. On the top or side of the field-magnet A, in close proximity to the binding-posts $e\ e$, is fixed an insulating slab or plate, G, upon which are mounted the several parts of a circuit-breaker. These latter consist of contact-points $f\ f'$, screwed into the material of the plate and connected with the binding-posts $e\ e$, respectively. A bar or plate, H, of brass, is pivoted midway between the points $f\ f'$, and carrying or formed with arms $h\ h$, projecting on each side in such manner as to make contact with the points $f\ f'$. The bar H has a handle, K, of insulating material, by which it is turned from side to side and the connection between points $f\ f'$ broken or established.

L is a coil of insulated wire, or it may be a stick of carbon, or any equivalent device that offers a very high resistance to the passage of a current. The opposite ends of the coil L are connected with the contact-points $f\ f'$, respectively, so that when the circuit through the field is interrupted by shifting the lever H there remains a path of very high resistance, but still capable of carrying the extra current or discharge that is developed, thus protecting the machine as well as the attendants from injury.

I am aware that with a circuit-breaker has been employed a resistance-coil or like device bridging the opposite contact-points. This therefore I do not specifically claim.

Having now described my invention, what I claim, and desire to secure by Letters Patent, is—

1. In a dynamo-electric machine, the combination, with the main circuit, of a derived field-circuit, a manual switch or circuit-breaker connected with said field-circuit, and a resistance-coil or its equivalent bridging the opposite contact-points of the switch, as and for the purpose set forth.

2. In a dynamo-electric machine, the combination, with the main circuit, of a derived field-circuit, a manual switch or circuit-breaker connected with said field-circuit and mounted on the frame or field-magnets of the machine, and a resistance-coil or equivalent bridging the opposite contact-points of the switch, as and for the purpose set forth.

In testimony whereof I have hereunto set my hand this 25th day of August, 1882.

EDWARD WESTON.

Witnesses:
HENRY A. BECKMEYER,
HENRY HILL.